(12) United States Patent
Blomberg et al.

(10) Patent No.: US 10,318,970 B2
(45) Date of Patent: Jun. 11, 2019

(54) GENERATING A SUCCINCT APPROXIMATE REPRESENTATION OF A TIME SERIES

(71) Applicant: INTERNATIONAL BUSINESS MACHINES CORPORATION, Armonk, NY (US)

(72) Inventors: Jeanette L. Blomberg, Portola Valley, CA (US); Neil H. A. Boyette, Oregon City, OR (US); Anca A. Chandra, Los Gatos, CA (US); Se Chan Oh, Stanford, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 14/046,843

(22) Filed: Oct. 4, 2013

(65) Prior Publication Data

US 2015/0100379 A1  Apr. 9, 2015

(51) Int. Cl.
*G06Q 30/02* (2012.01)

(52) U.S. Cl.
CPC ................. *G06Q 30/0202* (2013.01)

(58) Field of Classification Search
USPC ........................................ 705/7.31
See application file for complete search history.

(56) References Cited

U.S. PATENT DOCUMENTS

| | | |
|---|---|---|
| 5,652,842 A | 7/1997 | Siegrist, Jr. et al. |
| 5,995,924 A | 11/1999 | Terry |
| 6,151,582 A | 11/2000 | Huang et al. |
| 7,194,320 B2 | 3/2007 | Lefebvre |
| 7,236,964 B2 | 6/2007 | Labreuche |
| 7,526,486 B2 | 4/2009 | Cushman et al. |
| 7,765,122 B2 | 7/2010 | Shan |
| 7,765,123 B2 | 7/2010 | Shan et al. |
| 7,870,004 B2 | 1/2011 | Kananghinis et al. |

(Continued)

OTHER PUBLICATIONS

Himberg, J., et al., "Time series segmentation for context recognition in mobile devices", Proceedings of the 2001 IEEE International Conference on Data Mining, ICDM 2001, Nov. 29, 2001-Dec. 2, 2001, pp. 1-8, United States.

(Continued)

*Primary Examiner* — Eric W Stamber
*Assistant Examiner* — Arif Ullah
(74) *Attorney, Agent, or Firm* — Sherman IP LLP; Kenneth L. Sherman; Hemavathy Perumal

(57) ABSTRACT

Embodiments of the present invention provide a system, method and computer program product for generating a succinct approximate representation of a time series. A method comprises determining at least one peak data value and at least one trough data value of an input series comprising a sequence of data values over time. The input series is partitioned into multiple segments comprising at least one rising segment that rises to a peak data value and at least one falling segment that falls to a trough data value. A sequence of segments that rise and fall alternately is generated based on the segments. A sequence of totals representing a succinct approximate representation of the input series is generated. Each total comprises a sum of data values for a corresponding segment of the sequence of segments.

20 Claims, 10 Drawing Sheets

(56) References Cited

U.S. PATENT DOCUMENTS

| | | | |
|---|---|---|---|
| 7,885,848 B2 | 2/2011 | Kagan et al. | |
| 7,996,398 B2 | 8/2011 | Ortega et al. | |
| 8,315,972 B2 | 11/2012 | Chkodrov et al. | |
| 8,341,008 B2 | 12/2012 | Oku | |
| 8,412,493 B2 | 4/2013 | Duchenay et al. | |
| 8,463,679 B2 | 6/2013 | Kaplan et al. | |
| 8,615,434 B2 | 12/2013 | Benyamin et al. | |
| 8,805,836 B2 | 8/2014 | Hore et al. | |
| 9,020,959 B2 | 4/2015 | Deng | |
| 9,565,397 B2 | 2/2017 | Frink et al. | |
| 9,898,767 B2 | 2/2018 | Psota et al. | |
| 2002/0188487 A1* | 12/2002 | Fox | G06Q 30/06 707/732 |
| 2003/0163466 A1 | 8/2003 | Rajaraman et al. | |
| 2004/0117235 A1 | 6/2004 | Shacham et al. | |
| 2004/0117290 A1 | 6/2004 | Shacham et al. | |
| 2005/0228707 A1 | 10/2005 | Hendrickson | |
| 2005/0278255 A1 | 12/2005 | Hahn-Carlson | |
| 2006/0009993 A1 | 1/2006 | Guo et al. | |
| 2006/0184493 A1 | 8/2006 | Shiffman et al. | |
| 2006/0271582 A1* | 11/2006 | Collins | G06F 17/30477 |
| 2007/0156510 A1 | 7/2007 | Kim et al. | |
| 2008/0243660 A1 | 10/2008 | Amemiya et al. | |
| 2008/0243925 A1 | 10/2008 | Axe et al. | |
| 2009/0024407 A1* | 1/2009 | Shan | G06Q 10/04 705/348 |
| 2009/0094166 A1* | 4/2009 | Aymeloglu | G06Q 40/06 705/36 R |
| 2009/0234847 A1 | 9/2009 | Homma et al. | |
| 2009/0248461 A1 | 10/2009 | Bartsch et al. | |
| 2010/0057577 A1 | 3/2010 | Stefik et al. | |
| 2010/0138807 A1 | 6/2010 | Bogdan | |
| 2010/0312612 A1 | 12/2010 | Carr et al. | |
| 2011/0040636 A1 | 2/2011 | Simmons et al. | |
| 2011/0060603 A1* | 3/2011 | Capelli | G06F 17/30536 705/2 |
| 2011/0082824 A1 | 4/2011 | Allison et al. | |
| 2011/0126206 A1 | 5/2011 | Kato et al. | |
| 2011/0208539 A1* | 8/2011 | Lynn | A61B 5/087 705/2 |
| 2011/0231256 A1 | 9/2011 | Wang et al. | |
| 2011/0231336 A1 | 9/2011 | Hu et al. | |
| 2012/0029974 A1 | 2/2012 | Councill et al. | |
| 2012/0116747 A1 | 5/2012 | Hadar et al. | |
| 2012/0246638 A1 | 9/2012 | He et al. | |
| 2012/0284084 A1 | 11/2012 | Popkov et al. | |
| 2012/0310681 A1 | 12/2012 | Simon et al. | |
| 2012/0330996 A1 | 12/2012 | Chang et al. | |
| 2013/0018830 A1 | 1/2013 | Dhurandhar | |
| 2013/0060774 A1 | 3/2013 | Shepherd et al. | |
| 2013/0060783 A1 | 3/2013 | Baum et al. | |
| 2014/0122370 A1* | 5/2014 | Jamal | G06Q 30/0206 705/348 |
| 2014/0129325 A1 | 5/2014 | Zinger et al. | |
| 2015/0100367 A1 | 4/2015 | Blomberg et al. | |
| 2015/0100368 A1 | 4/2015 | Blomberg et al. | |
| 2015/0100369 A1 | 4/2015 | Blomberg et al. | |
| 2015/0379429 A1 | 12/2015 | Lee et al. | |
| 2015/0379430 A1 | 12/2015 | Dirac et al. | |
| 2016/0358097 A1 | 12/2016 | Blomberg | |

OTHER PUBLICATIONS

Fu, T., "A review on time series data mining", Feb. 2011, Elsevier, Engineering Applications of Artificial Intelligence, pp. 164-181, vol. 24, Issue 1, United States.

Nagpaul, P.S., "Time Series Analysis in WinIDAMS", Apr. 2005, Untied Nations Organization for Education, Science, and Culture (UNESCO), pp. 1-47, France.

Mehta, K., "Top Down or Bottom Up? Consider Hybrid", Sep. 1, 2006, Information Management, pp. 1-4, United States.

Fink, E., "Indexing of Compressed Time Series", Jan. 1, 2004, Computer Science Department, Paper 616, pp. 1-26, Carenegie Mellon University, United States.

Keogh, E. et al., "An Online Algorithm for Segmenting Time Series", Proceedings of the 2001 IEEE International Conference on Data Mining, 2001, pp. 1-46, IEEE, United States.

Kahn, K. et al., "Revisiting Top-Down Versus Bottom-Up Forecasting", The Journal of Business Forecasting, Summer 1998, pp. 14-19, United States.

Pourabbas, E. et al., "Characterization of Hierarchies and Some Operators in OLAP Environment", DOLAP '99 Proceedings of the 2nd ACM International Workshop on Data Warehousing and OLPAP, pp. 1-17, ACM, United States.

Tsois, A. et al., "MAC: Conceptual Data Modeling for OLAP", Proceedings of the International Workshop on Design and Management of Data Warehouses (DMDW), Jun. 2001, pp. 1-11, United States.

Chen, X. et al. "Vector Symbolization Algorithm for Time Series Based on Segmentation Mode", China Academic Journal Electronic Publishing House, Feb. 2011, pp. 1-3, vol. 37, No. 4, National Knowledge Infrastructure, CNKI, China (Abstract p. 1).

Anonymously, "Smart data population in social way", Jun. 13, 2013, pp. 1-8, IP.com, United States.

Motahari Nezhad, H.R. et al., "Health Identification and Outcome Prediction for Outsourcing Services Based on Textual Comments", Proceedings of the 2014 International Conference on Services Computing (SCC), Jun. 27, 2014-Jul. 2, 2014, pp. 1-8, IEEE, United States.

Chan, Y. et al., "Hardening the EWLM Performance Data", Feb. 2006, pp. 1-52, 2nd Edition, IBM, United States.

U.S. Non-Final Office Action for U.S. Appl. No. 14/046,849 dated Jul. 1, 2015.

U.S. Non-Final Office Action for U.S. Appl. No. 14/046,852 dated Jul. 17, 2015.

U.S. Non-Final Office Action for U.S. Appl. No. 14/046,861 dated Jun. 18, 2015.

U.S. Advisory Action for U.S. Appl. No. 14/046,852 dated Mar. 21, 2016.

U.S. Final Office Action for U.S. Appl. No. 14/046,849 dated Feb. 8, 2016.

U.S. Final Office Action for U.S. Appl. No. 14/046,852 dated Jan. 6, 2016.

U.S. Final Office Action for U.S. Appl. No. 14/046,861 dated Feb. 5, 2016.

U.S. Non-Final Office Action for U.S. Appl. No. 14/046,852 dated May 20, 2016.

U.S. Final Office Action for U.S. Appl. No. 14/046,852 dated Dec. 2, 2016.

U.S. Non-Final Office Action for U.S. Appl. No. 14/046,852 dated May 1, 2017.

U.S. Non-Final Office Action for U.S. Appl. No. 14/728,926 dated Feb. 26, 2018.

U.S. Final Office Action for U.S. Appl. No. 14/728,926 dated Sep. 28, 2018.

U.S. Advisory Action for U.S. Appl. No. 14/728,926 dated Jan. 8, 2019.

U.S. Notice of Allowance for U.S. Appl. No. 14/728,926 dated Feb. 14, 2019.

* cited by examiner

70

| p | value |
|---|---|
| p[0] | 0 |
| p[1] | 0 |
| p[2] | 1 |
| p[3] | 0 |
| p[4] | -1 |
| p[5] | 0 |

71 → p[2] row: Indicates Peak Data Value
71 → p[4] row: Indicates Trough Data Value

| Segment | Total | Length | Character |
|---|---|---|---|
| First Segment | 6 | 3 | Peak/Rise |
| Second Segment | 3 | 2 | Trough/Fall |
| Third Segment | 1 | 1 | Neither |

Succinct Approximate Representation

```
┌─────────────────────────────────┐
│ Partition a Sequence of Cost Values │
│ Over Time for a Service Delivery Project │
│ into Multiple Segments, Wherein Each │── 477
│ Segment Comprises a Contiguous │
│ Subsequence of the Sequence of Cost │
│ Values, and Wherein the Segments │
│ Comprise At Least One of a Segment │
│ That Rises to a Peak Cost Value of the │
│ Sequence of Cost Values and a │
│ Segment That Falls to a Trough Cost │
│ Value of the Sequence of Cost Values │
└─────────────────────────────────┘
                │
                ▼
┌─────────────────────────────────┐
│ Generate a Sequence of Segments │
│ That Rise and Fall Alternately Based on │
│ the Segments, Wherein the Sequence of │── 478
│ Segments Comprises a Segment That │
│ Rises to a Peak Cost Value and is │
│ Consecutively Followed by Another │
│ Segment That Falls to a Trough Cost │
│ Value │
└─────────────────────────────────┘
                │
                ▼
┌─────────────────────────────────┐
│ Based on the Sequence of Segments, │
│ Generate a Corresponding Sequence │
│ of Total Cost Values Representing a │── 479
│ Succinct Approximate Representation of │
│ the Sequence of Cost Values, Wherein │
│ Each Total Cost Value Comprises a Sum │
│ of Cost Values for a Corresponding │
│ Segment of the Sequence of Segments │
└─────────────────────────────────┘
```

FIG. 6C

US 10,318,970 B2

GENERATING A SUCCINCT APPROXIMATE REPRESENTATION OF A TIME SERIES

FIELD OF THE INVENTION

The present invention generally relates to forecasting costs associated with service delivery, and more particularly, to a system, method and computer program product for generating a succinct approximate representation of a time series.

BACKGROUND

A service provider offers services (e.g., Information Technology services) to customers. A service delivery engagement involves the delivery of services offered. A service delivery engagement may be complex. For example, the delivery of services may span many years (e.g., a multi-year service delivery project). As another example, the delivery of services may involve delivery and/or customer locations in multiple countries (e.g., a multi-country service delivery project). Modeling cost estimations for a service delivery engagement is based on multiple variables, such as socio-economic conditions of delivery and/or customer locations, demand for services offered, infrastructure needed to support the services offered, etc.

BRIEF SUMMARY

Embodiments of the present invention provide a system, method and computer program product for generating a succinct approximate representation of a time series. A method comprises determining at least one peak data value and at least one trough data value of an input series comprising a sequence of data values over time. Each data value denotes an element or a data point of the time series, wherein the data value has a corresponding position in the time series and a corresponding amount. The input series is partitioned into multiple segments comprising at least one rising segment that rises to a peak data value and at least one falling segment that falls to a trough data value. A sequence of segments that rise and fall alternately is generated based on the segments. A sequence of totals representing a succinct approximate representation of the input series is generated. Each total comprises a sum of data values for a corresponding segment of the sequence of segments.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5A illustrates an example peak and trough indicator array for an example input time series, according to an embodiment of the present invention;

FIG. 5B illustrates an example segment table for an example input time series, according to an embodiment of the present invention;

FIG. 6C illustrates a flowchart of an example process for generating a sequence of segments that rise and fall alternately for a sequence of cost values for a service delivery project, according to an embodiment of the present invention;

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to forecasting costs associated with service delivery, and more particularly, to a system, method and computer program product for generating a succinct approximate representation of a time series. Embodiments of the invention provide segmentation of an input time series comprising a sequence of data values over time. Specifically, embodiments of the invention partition the input time series into multiple segments based on peak data values and trough data values of the input time series. A sequence of segments that rise and fall alternately is generated based on the segments. Based on the sequence of segments, embodiments of the invention generate a sequence of totals representing a succinct approximate representation of the input series. Each total comprises a sum of data values for a corresponding segment of the sequence of segments.

Figure 1:
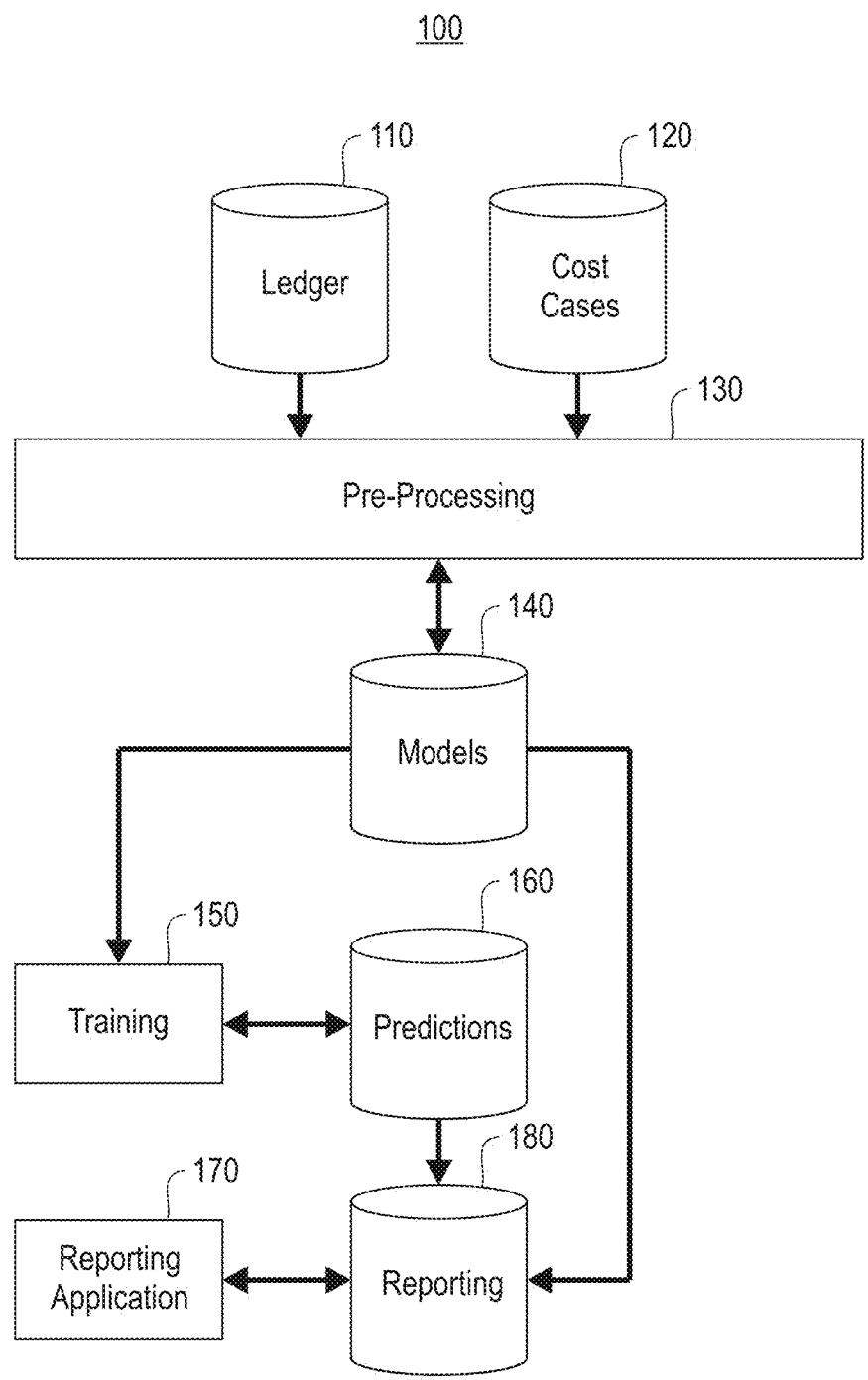
FIG. 1 illustrates an example system for forecasting costs associated with service delivery, according to an embodiment of the present invention.

Referring now to the drawings, FIG. 1 illustrates an example system 100 for forecasting costs associated with service delivery, according to a preferred embodiment of the present invention. The system 100 comprises a ledger storage unit 110, a cost cases storage unit 120, a pre-processing unit 130, a models storage unit 140, a training unit 150, a predictions storage unit 160, a reporting application 170, and a reporting storage unit 180.

Forecasting long-term costs associated with a service delivery project requires a sizable amount of input data, such as ledger data, meta data related to service contracts, and cost cases. The ledger storage unit 110 maintains ledger data representing actual data, such as actual costs or revenue, for one or more projects. For example, the ledger data maintained may comprise a set of monthly entries of cost or revenue incurred by an ongoing service delivery project. In one embodiment, the ledger storage unit 110 resides on one or more server databases.

The cost cases storage unit 120 maintains one or more cost cases. A cost case is a detailed plan providing cost estimations for a planned project (e.g., a planned service delivery project). A cost case is typically developed by a service provider during engagement with a potential customer and before any contract negotiation or signing. In one embodiment, the cost cases storage unit 120 resides on one or more server databases.

A cost case includes data relating to a potential customer and data describing services offered to the potential customer. For example, a cost case may include multiple line items describing service components for a planned project (e.g., a list of prices for various service components related to Information Technology (IT) services, such as storage management, middleware support, etc.).

The input data may become available at different intervals. For example, the system 100 may acquire/update ledger data, service contract meta data and cost cases for the ledger storage unit 110 and the cost cases storage unit 120 on a monthly basis.

The pre-processing unit 130 is configured to pre-process input data. Pre-processing operations that the pre-processing unit 130 is configured to perform include smoothing input data, identifying terminating service contracts and replacements for the terminating service contracts, generating (i.e., constructing) typical models, extrapolating actual data into the past, and generating estimate models. In one embodiment, the pre-processing unit 130 may perform multiple pre-processing operations in parallel.

The models storage unit 140 maintains one or more estimate models generated by the pre-processing unit 130. In one embodiment, the models storage unit 140 resides on one or more server databases.

The training unit 150 is configured to train each estimate model maintained in the models storage unit 140 to better fit actual data. Each estimate model has a corresponding model parameter that is applicable to only said estimate model. To minimize discrepancies between an aggregate of all estimate models and a corresponding aggregate of all ledger data for corresponding projects, the training unit 150 makes adjustments to values of the model parameters. In one embodiment, the training unit 150 forecasts future cost data for an ongoing project based on the following: either one or more models based on a cost case for the project, or one or more generic models.

The predictions storage unit 160 maintains long range cost estimations for one or more planned or ongoing projects.

The reporting storage unit 180 maintains read-only, pre-indexed data for the reporting application 170. The data maintained in the reporting storage unit 180 is extracted from the models storage unit 140 and the predictions storage unit 160. The reporting application 170 comprises a reporting application configured to report forecasting results via an interactive user interface. The reporting application 170 allows for data to be aggregated or filtered in various ways. For example, the reporting application 170 allows filtering by domain (e.g., filtering by business domain) or any grouping of dimensions (e.g., grouping by sector and customer).

Figure 2:
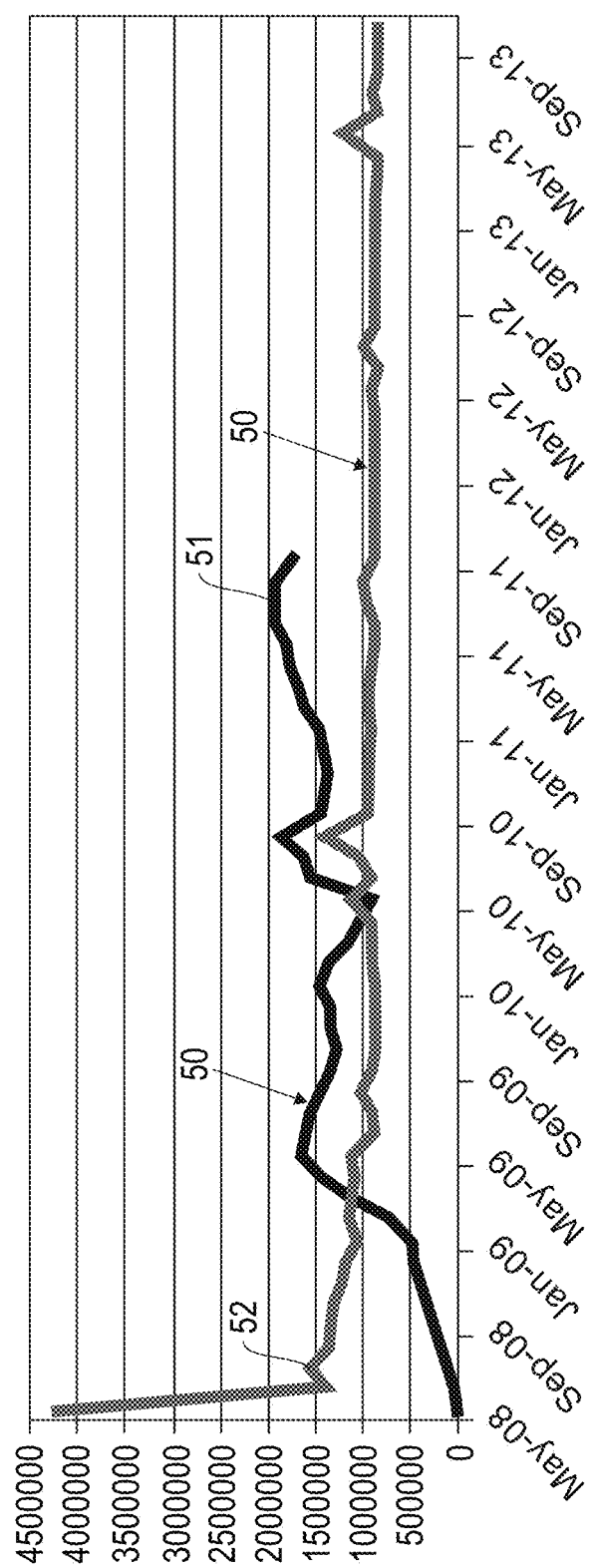
FIG. 2 illustrates two examples of graphs of time series.

FIG. 2 illustrates two examples of graphs of time series 50. Typically, a time series 50 comprises a periodic sequence of values (e.g., costs, profits, revenue) as a function of time. In one embodiment, some of the ledger data maintained in the ledger storage unit 110 may be represented as one or more time series models 50, wherein each time series 50 comprises a sequence of actual costs incurred by an ongoing service delivery project over time (e.g., time series 51 shown in FIG. 2). Similarly, some of the cost cases maintained in the cost cases storage unit 120 may be represented as one or more time series models 50, wherein each time series 50 comprises a sequence of cost estimations for a planned service delivery project over time (e.g., time series 52 shown in FIG. 2).

Figure 3:
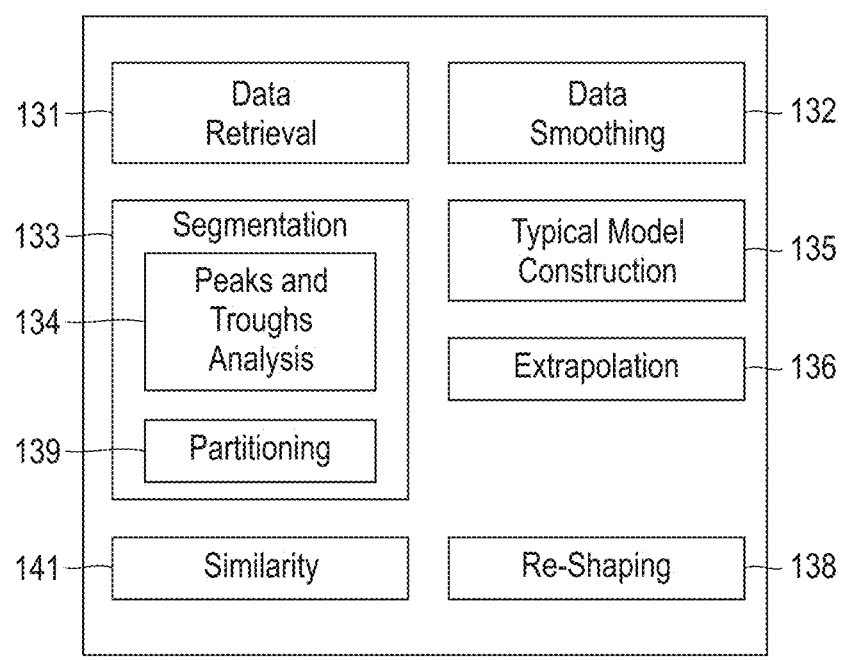
FIG. 3 illustrates an example pre-processing unit, according to an embodiment of the present invention.

FIG. 3 illustrates an example pre-processing unit 130, according to an embodiment of the present invention. The pre-processing unit 130 comprises a data retrieval module 131, a data smoothing module 132, a segmentation module 133, a typical model construction module 135, an extrapolation module 136, a re-shaping module 138, and a similarity module 141.

The data retrieval module 131 is configured to acquire input data from the ledger storage unit 110 and/or the cost cases storage unit 120. As stated above, the pre-processing unit 130 is configured to perform multiple pre-processing operations. Specifically, the data smoothing module 132 is configured to smooth input data to minimize noise. For example, a 3-month simple moving average may be used to smooth input data acquired on a monthly basis. In one embodiment, smoothing of input data may be enabled or disabled.

The typical model construction module 135 is configured to generate (i.e., construct) typical models. The typical model construction module 135 constructs a typical model based on ledger data, such as initial sequences of ledger data experienced during periods where significant changes in accounting practices are minimal. Typical models provide good extrapolations of cost behavior during early volatile cost behavior.

The extrapolation module 136 is configured to extend ledger data into the past and/or into the future. In one example, ledger data are extended into the past in order to enable alignment of the ledger data with a cost case. In another example, a generic model for a project is created by extending ledger data into the future.

The extrapolation module 136 extends ledger data for a project into the past by extending the ledger data to when the project began and before first available ledger data. Specifically, the extrapolation module 136 adds the required number of elements of a scaled version of a typical model to the beginning of the ledger data, wherein a scaling factor that fits the typical model to the ledger data are determined. The extrapolation module 136 extends ledger data for a project into the future by adding a scaled typical model to the end of the ledger data, thereby forming a generic model for the project. If the project is scheduled to run longer than the generic model, the extrapolation module 136 extends the generic model to the scheduled project end date based on a final segment of the generic model.

The re-shaping module 138 is configured to align one or more models based on a cost case to historical ledger data, and reshape cost estimations for the cost case based on actual costs reflected in ledger data.

Some of the pre-processing operations described above may require segmentation of an input time series 50. The segmentation module 133 is configured to generate a segmented model 200 (FIG. 4) for an input time series 50. Specifically, the segmentation module 133 comprises a peaks and troughs analysis module 134 configured for determining peak data values (e.g., peak costs) and trough data values (e.g., trough costs) of the input time series 50. In this specification, a data value denotes an element or a data point of a time series, wherein the data value has a corresponding position in the time series and a corresponding amount. In one embodiment, the peaks and troughs analysis module 134 generates a corresponding indicator array 70 (FIG. 5A) for the input time series 50. The indicator array 70 comprises a corresponding indicator 71 (FIG. 5A) for each data value (i.e., data point) of the input time series 50. A corresponding indicator 71 for a data value of the input time series 50 indicates whether said data value is a peak data value, a trough data value, or neither a peak data value nor a trough data value.

The segmentation module 133 further comprises a partitioning module 139 configured for partitioning the input time series 50 into multiple segments based on the peak data values and trough data values determined, wherein each segment represents a contiguous subsequence of data values. For example, each segment may represent a contiguous subsequence of costs. With the possible exception of a last segment for the input time series 50, each segment ends in either a peak data value or a trough data value. The partitioning module 139 is further configured to generate a succinct approximate representation of the input time series 50 based on the segments of the input time series 50.

In this specification, let the term pre-determined length denote the length of a sequence of neighboring data values.

In one embodiment, a peak data value is a data value that satisfies each of the following conditions: (1) the peak data value is greater than a data value immediately preceding ("immediate predecessor") the peak data value, (2) the peak data value is no less than any data value of a sequence of neighboring data values of a pre-determined length immediately preceding the peak data value, and (3) the peak data value is no less than any data value of a sequence of neighboring data values of a pre-determined length immediately following the peak data value.

In one embodiment, a trough data value is a data value that satisfies each of the following conditions: (1) the trough data value is less than a data value immediately preceding ("immediate predecessor") the trough data value, (2) the trough data value is no greater than any data value of a sequence of neighboring data values of a pre-determined length immediately preceding the trough data value, and (3) the trough data value is no greater than any data value of a sequence of neighboring data values of a pre-determined length immediately following the trough data value.

If data values of an input time series 50 represents costs, a peak data value represents a peak cost and a trough data value represents a trough cost.

In this specification, let x represent an example input time series comprising n data values, such as data values $x[0]$, $x[1], \ldots,$ and $x[n-1]$. Let p represent an example peak and trough indicator array for the input time series x, wherein the indicator array p comprises n indicators 71, such as indicators $p[0], p[1], \ldots, p[n-1]$. Each indicator $p[i]$ indicates whether a corresponding data value of the input time series x is a peak data value, a trough data value or neither a peak data value nor a trough data value.

In one embodiment, the peaks and troughs analysis module 134 sets each indicator $p[i]$ of the indicator array p to 0, 1, or −1. Specifically, the peaks and troughs analysis module 134 sets an indicator $p[i]$ to 1 if a corresponding data value is a peak. The segmentation module 133 sets an indicator $p[i]$ to −1 if a corresponding element data value is a trough. The segmentation module 133 sets an indicator $p[i]$ to 0 if a corresponding data value is neither a peak nor a trough. The input time series x is partitioned into segments based on the non-zero indicators 71 of the indicator array p.

Table 1 below provides example pseudo code for determining peak data values and trough data values of an input time series x.

TABLE 1

```
//Initialize each entry of the indicator array p to 0
p[0], . . . ,p[n−1] = 0;
//Initialize index i to 0
i = 0;
//Initialize variable state to 'begin' state
state = begin;
// Extend each end of input time series x by a subsequence of elements of pre-determined length,
//respectively (e.g., if the pre-determined length is 2, input time series x is concatenated with two
//elements to the left and two elements to the right)
x = x[0], 0 + x + x[n−1], x[n−1];
do {
    //Set index j to the sum of i and a pre-determined length (e.g., 2)
    j = i + 2;
    //Determine if x[j] is a provisional peak by comparing x[j] against the following: a
    //subsequence of data values of pre-determined length immediately preceding x[j], and
    //a subsequence of data values of pre-determined length immediately succeeding x[j]
    if (provisionalPeak(x[j−2], . . . , x[j+2])) {
        //x[j] is a provisional peak
        //Determine whether previous non-zero indicator p[k] indicates a provisional peak
        if (state == peak) {
```

TABLE 1-continued

```
            //If indicator p[k] indicates a provisional peak, set indicator p[k] to 0,
            //thereby biasing a peak towards the right
            p[k] = 0;
        }
        //Set variable state to 'peak' to indicate a provisional peak for the
        //most recent segment analyzed
        state = peak;
        //Set indicator p[i] to 1, indicating a provisional peak
        p[i] = 1;
        //Set k to i, wherein k references index of a non-zero indicator of indicator
        //array p
        k = i;
    }
    else {
        //Determine if x[j] is a provisional trough by comparing x[j] against the
        //following: a subsequence of data values of pre-determined length immediately
        //preceding x[j], and a subsequence of data values of pre-determined length
        //immediately succeeding x[j]
        if (provisionalTrough(x[j-2], . . . , x[j+2])) {
            //x[j] is a provisional trough
            //Determine whether previous non-zero indicator p[k] indicates a
            //provisional trough
            if (state == trough) {
                //If indicator p[k] indicates a provisional trough, set indicator
                //p[k] to 0, thereby biasing a trough towards the right
                p[k] = 0;
            }
            //Set variable state to 'trough' to indicate a provisional trough for the
            //most recent segment analyzed
            state = trough;
            //Set indicator p[i] to -1, indicating a provisional trough
            p[i] = -1;
            //Set k to i, wherein k references index of a non-zero indicator of indicator
            //array p
            k = i;
        }
    }
//Increment iteration index i
i = i + 1;
}while (i <= n-1) //repeat loop while iteration index i is less than or equal to n-1
//if iteration index i is greater than n-1, output indicator array p
output p;
```

As shown in Table 1, in one embodiment, the peaks and troughs analysis module 134 iterates through each data value of an input time series 50 to determine whether the data value represents a provisional peak, a provisional trough or neither. Specifically, for each data value, the peaks and troughs analysis module 134 determines whether the data value is a provisional peak or a provisional trough in the context of neighboring data values, such as a first sequence of neighboring data values immediately preceding the data value and a second sequence of neighboring data values immediately following the data value. The first sequence of neighboring data values may have the same number of data values (i.e., the same length) as the second sequence of neighboring data values.

Before the peaks and troughs analysis module 134 iterates through each data value of the input time series 50, the peaks and troughs analysis module 134 may initialize parameters/variables for use during segmentation. For example, the peaks and troughs analysis module 134 may extend each end of the input time series 50 (i.e., the beginning and the end of the input time series 50) by concatenating a sequence of data values of pre-determined length to each end of the input time series 50.

For example, assume an example initial input time series x comprising an array of data values [1, 2, 3, 2, 1, 1]. If the pre-determined length is set to 2, each end of the initial input time series x is concatenated with 2 data values, thereby producing an extended input time series x. For example, a first sequence of data values [1, 0] and a second sequence of data values [1, 1] may be appended to the beginning and the end of the initial input time series x, respectively, to generate the extended input time series x comprising an array of data values [1, 0, 1, 2, 3, 2, 1, 1, 1, 1].

An indicator array p for the input time series x is initialized by setting each entry p[i] of the indicator array p to zero. In this specification, let i denote an iteration index for the indicator array p, wherein i is initialized to zero. Let j denote an iteration index for the extended input time series x, wherein j is initialized to the sum of i and the pre-determined length (i.e., j references the first data value of the initial input time series x). Let state denote a variable that identifies the most recent non-zero indicator p[i], wherein state is initialized to 'begin'.

As the iteration index j is offset by the pre-determined length, an indicator p[i] of the indicator array p corresponds to a data value x[j] of the initial input time series 50. For each iteration of i wherein i is no greater than n-1, the peaks and troughs analysis module 134 determines whether a corresponding data value x[j] for the indicator p[i] is a provisional peak, a provisional trough or neither. Assuming the pre-determined length is 2, the peaks and troughs analysis module 134 determines whether the data value x[j] is a provisional peak or a provisional trough in the context of neighboring data values x[j-2], x[j-1], x[j+1] and x[j+2]. The peaks and troughs analysis module 134 determines that the data value x[j] is a peak data value if the following conditions are satisfied: (1) x[j] is greater than x[j-1], and (2) x[j] is greater than or equal to x[j-2], x[j+1], and x[j+2].

The peaks and troughs analysis module 134 sets an indicator p[i] for the data value x[j] to 1 if the data value x[j] is a provisional peak.

The peaks and troughs analysis module 134 determines that x[j] is a trough cost if the following conditions are satisfied: (1) x[j] is less than x[j−1], and (2) x[j] is less than or equal to x[j−2], x[j+1], and x[j+2]. The peaks and troughs analysis module 134 sets an indicator p[i] for the data value x[j] to −1 if the data value x[j] is a provisional trough. The peaks and troughs analysis module 134 sets an indicator p[i] for the data value x[j] to 0 if the data value x[j] is neither a provisional peak nor a provisional trough.

Assume the peak and troughs analysis module 134 determines peak data values and trough data values of the example input time series x using the example extended input time series x comprising the array of data values [1, 0, 1, 2, 3, 2, 1, 1, 1, 1]. When i is equal to 0 and j is equal to 2, the peaks and troughs analysis module 134 determines whether the data value x[2] is a provisional peak or a provisional trough in the context of neighboring data values x[0], x[1], x[3] and x[4]. x[2] is not a provisional peak because x[2] is less than x[3]. x[2] is also not a provisional trough because x[2] is greater than x[1]. Therefore, a corresponding indicator p[0] is set to 0, indicating that x[2] is neither a peak nor a trough.

When i is equal to 1 and j is equal to 3, the peaks and troughs analysis module 134 determines whether the data value x[3] is a provisional peak or a provisional trough in the context of neighboring data values x[1], x[2], x[4] and x[5]. x[3] is not a provisional peak because x[3] is less than x[4]. x[3] is also not a provisional trough because x[3] is greater than x[2]. Therefore, a corresponding indicator p[1] is set to 0, indicating that x[3] is neither a peak nor a trough.

When i is equal to 2 and j is equal to 4, the peaks and troughs analysis module 134 determines whether the data value x[4] is a provisional peak or a provisional trough in the context of neighboring data values x[2], x[3], x[5] and x[6]. x[4] is a provisional peak because x[4] is greater than x[2], x[3], x[5] and x[6]. Therefore, p[2] is set to 1, indicating that x[4] is a provisional peak.

When i is equal to 3 and j is equal to 5, the peaks and troughs analysis module 134 determines whether the data value x[5] is a provisional peak or a provisional trough in the context of neighboring data values x[3], x[4], x[6] and x[7]. x[5] is less than x[4] but greater than x[6]. Therefore, p[3] is set to 0, indicating that x[5] is neither a peak nor a trough.

When i is equal to 4 and j is equal to 6, the peaks and troughs analysis module 134 determines whether the data value x[6] is a provisional peak or a provisional trough in the context of neighboring data values x[4], x[5], x[7] and x[8]. x[6] is a provisional trough because x[6] is less than or equal to x[4], x[7] and x[8], and x[6] is less than x[5]. Therefore, p[4] is set to −1, indicating that x[6] is a provisional trough.

When i is equal to 5 and j is equal to 7, the peaks and troughs analysis module 134 determines whether the data value x[7] is a provisional peak or a provisional trough in the context of neighboring data values x[5], x[6], x[8] and x[9]. x[7] is equal to x[6] and x[8]. Therefore, p[5] is set to 0, indicating that x[7] is neither a peak nor a trough.

The resulting indicator array p for the example initial input time series x comprises an array of indicators [0, 0, 1, 0, −1, 0].

The peaks and troughs analysis module 134 is further configured to concatenate (i.e., merge) consecutive (i.e., adjacent) segments that rise (i.e., each consecutive segment ends in a peak data value) and concatenate consecutive segments that fall (i.e., each consecutive segment ends in a trough data value). Therefore, the segmentation module 133 produces a sequence of segments of alternating character (i.e., an alternating rise and fall character).

For example, if a first segment ending in a peak data value is consecutively followed by a second segment ending in a peak data value (i.e., the first and second segments are adjacent rising segments), the first and second segments are concatenated into one segment having a peak/rise character. Specifically, a corresponding indicator 71 for the first segment is set to 0, thereby biasing a peak data value towards the right.

As another example, if a first segment ending in a trough data value is consecutively followed by a second segment ending in a trough data value (i.e., the first and second segments are adjacent falling segments), the first and the second segments are concatenated into one segment having a trough/fall character. Specifically, a corresponding indicator 71 for the first segment is set to 0, thereby biasing a trough data value towards the right.

The partitioning module 139 partitions an input time series 50 into segments based on the non-zero indicators 71 of a corresponding indicator array 70. For example, as the resulting indicator array p for the example initial input time series x comprises the array of indicators [0, 0, 1, 0, −1, 0], no concatenation/merging is needed for the indicator array p (i.e., there are no consecutive segments that fall/rise). A segmented model 200 for the example initial input time series x comprises three segments: a first segment comprising the data values x[0], x[1] and x[2] of the example initial input time series x (i.e., 1, 2, 3), a second segment comprising the data values x[3] and x[4] of the example initial input time series x (i.e., 2, 1), and a third segment comprising the data value x[5] of the example initial input time series x (i.e., 1).

The segmentation of an input time series 50 is a fast computation. The segmentation is converted into a sequence of totals, wherein each total corresponds to a segment, and wherein each total represents a sum of data values of a corresponding segment. The sequence of totals provides a succinct approximate representation of the input time series 50 that captures milestones, independent of timing.

The partitioning module 139 is further configured to generate a succinct approximate representation for an input time series 50 based on a corresponding segmented model 200 for the input time series 50. Specifically, for each segment of a corresponding segmented model 200 for an input time series 50, the partitioning module 139 computes a total equal to the sum of data values included in said segment. For example, the totals for the first segment, the second segment, and the third segment of the example initial input time series x are 6, 3, and 1, respectively. Therefore, the sequence of totals 6, 3, 1 represent a succinct approximate representation of the example initial input time series x.

In one embodiment, the partitioning module 139 provides a segment table 75 (FIG. 5B) for the segmented model 200, wherein each entry of the segment table 75 comprises segment information for a corresponding segment. Segment information for a segment may include a total representing a combined sum of data values included in the segment, a length of the segment, and a character of the segment.

In one embodiment, the peak data values and trough data values identified represent milestones in a service delivery project. Relevant patterns of costs are represented as ratios between total costs of various segments. Even if timing durations vary in unpredictable ways, a ratio of total costs between a trough and peak to total costs between a subsequent trough and peak has small variance among similar projects or parts of projects (i.e., a total cost for a milestone is predictable).

In one embodiment, each peak data value of an input series 50 is no less than at least three other data values of the input series 50. Specifically, each peak data value is greater than a data value immediately preceding the peak data value in the input series 50. Each peak data of the input series 50 further satisfies the following conditions: (1) the peak data value is no less than each data value of a first subsequence of data values, and (2) the peak data value is no less than each data value of a second subsequence of data values. In one example implementation, the first subsequence of data values comprises at least two data values immediately preceding the peak data value in the input series 50, and the second subsequence of data values comprises at least one data value immediately following the peak data value in the input series 50. In another example implementation, the first subsequence of data values comprises at least one data value immediately preceding the peak data value in the input series 50, and the second subsequence of data values comprises at least two data values immediately following the peak data value in the input series 50.

In one embodiment, each trough data value of an input series 50 is no greater than at least three other data values of the input series 50. Specifically, each trough data value is less than a data value immediately preceding the trough data value in the input series 50. Each trough data of the input series 50 further satisfies the following conditions: (1) the trough data value is no greater than each data value of a first subsequence of data values, and (2) the trough data value is no greater than each data value of a second subsequence of data values. In one example implementation, the first subsequence of data values comprises at least two data values immediately preceding the trough data value in the input series 50, and the second subsequence of data values comprises at least one data value immediately following the trough data value in the input series 50. In another example implementation, the first subsequence of data values comprises at least one data value immediately preceding the trough data value in the input series 50, and the second subsequence of data values comprises at least two data values immediately following the trough data value in the input series 50.

In one embodiment, the segmentation module 133 further comprises a similarity module 141 configured for determining whether a first service delivery project is similar to a second service delivery project. Specifically, the similarity module 141 utilizes the segmentation module 133 to generate a first segmented model 200 (i.e., a first sequence of segments that rise and fall alternately) for a first input series 50 comprising a sequence of costs over time for the first service delivery project. The similarity module 141 further utilizes the segmentation module 133 to generate a second segmented model 200 (i.e., a second sequence of segments that rise and fall alternately) for a second input series 50 comprising a sequence of costs over time for the second service delivery project. For each segmented model 200, the similarity module 141 determines a corresponding length for said segmented model 200. The similarity module 141 further determines a correlation coefficient between the first segmented model 200 and the second segmented model 200. The similarity module 141 determines that the first service delivery project is similar to the second service delivery project when the first segmented model 200 and the second segmented model 200 have the same length, and the correlation coefficient between the first segmented model 200 and the second segmented model 200 exceeds a pre-determined threshold.

Figure 4:
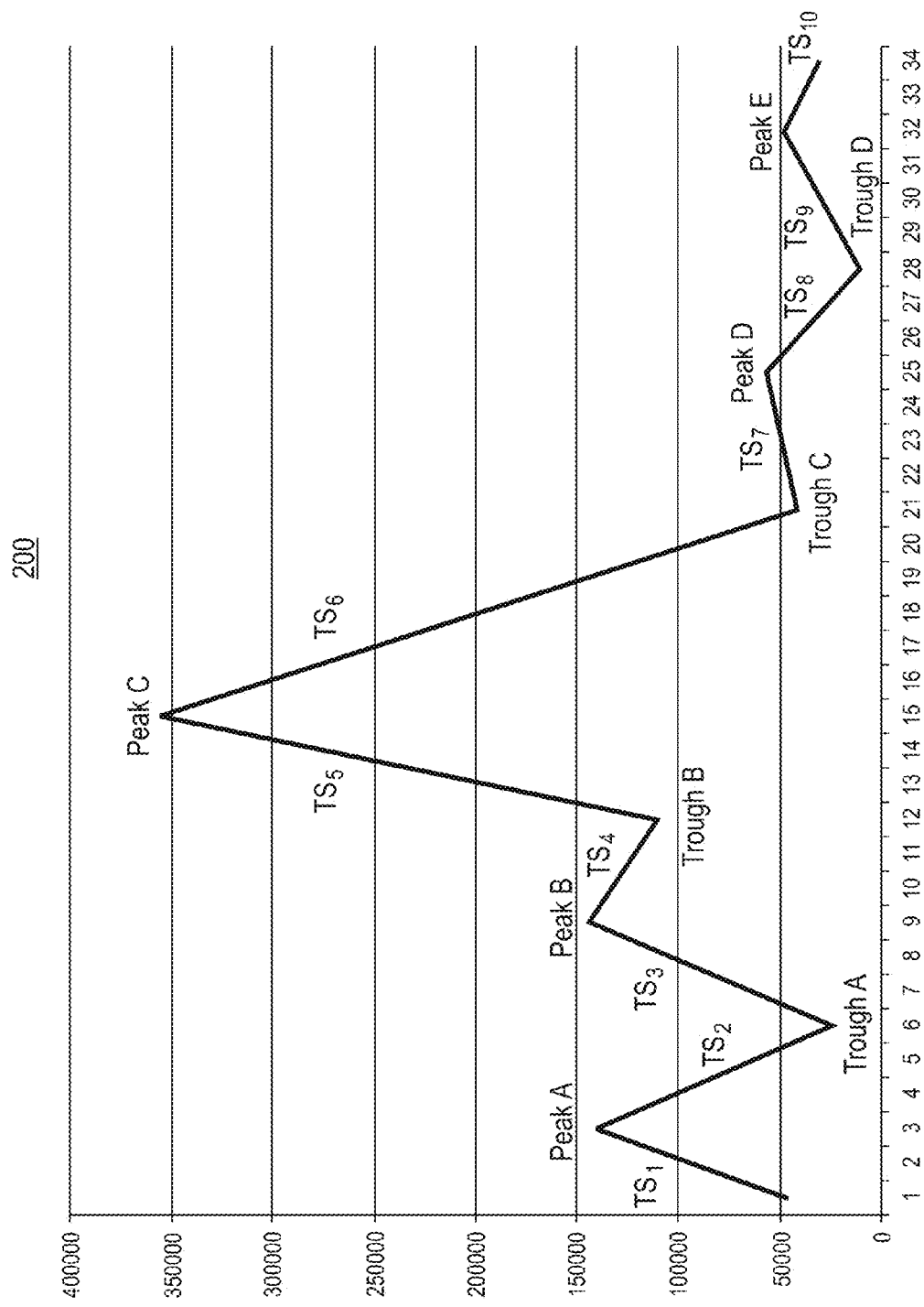
FIG. 4 illustrates an example segmented model, according to an embodiment of the present invention.

FIG. 4 illustrates an example segmented model 200, according to an embodiment of the present invention. A segmented model 200 provides alternating patterns for identifying similar processes. Specifically, the segmented model 200 comprises a sequence of segments of alternating character, such as a first segment $TS_1$ having a peak/rise character, a second segment $TS_2$ having a trough/fall character, a third segment $TS_3$ having a peak/rise character, a fourth segment $TS_4$ having a trough/fall character, a fifth segment $TS_5$ having a peak/rise character, a sixth segment $TS_6$ having a trough/fall character, a seventh segment $TS_7$ having a peak/rise character, an eighth segment $TS_8$ having a trough/fall character, a ninth segment $TS_9$ having a peak/rise character, and a tenth segment $TS_{10}$ having a trough/fall character.

With the possible exception of a last segment, each segment of the segmented model 200 ends in either a peak cost or a trough cost. As shown in FIG. 4, the first segment $TS_1$ ends at a first peak cost Peak A, the second segment $TS_2$ ends at a first trough cost Trough A, the third segment $TS_3$ ends at a second peak cost Peak B, the fourth segment $TS_4$ ends at a second trough cost Trough B, the fifth segment $TS_5$ ends at a third peak cost Peak C, the sixth segment $TS_6$ ends at a third trough cost Trough C, the seventh segment $TS_7$ ends at a fourth peak cost Peak D, the eighth segment $TS_8$ ends at a fourth trough cost Trough D, and the ninth segment $TS_9$ ends at a fifth peak cost Peak E.

FIG. 5A illustrates an example peak and trough indicator array 70 for an example input time series 50, according to an embodiment of the present invention. Assume an input time series 50 comprises n data values. A corresponding indicator array 70 for the input time series 50 comprises n indicators 71. Each indicator 71 indicates whether a corresponding data value of the input time series 50 is a peak, trough or neither a peak nor a trough.

For example, as described above, the example initial input time series x comprising the sequence of data values [1, 2, 3, 2, 1, 1] has a corresponding indicator array 70 comprising the sequence of indicators [0, 0, 1, 0, −1, 0]. FIG. 5A illustrates the indicator array 70 for the example initial input time series x. As shown in FIG. 5A, indicator p[2] corresponding to data value x[2] indicates that data value x[2] is a peak data value. Indicator p[4] corresponding to data value x[4] indicates that data value x[4] is a trough data value.

FIG. 5B illustrates an example segment table 75 for an example input time series 50, according to an embodiment of the present invention. As described above, partitioning of an input time series 50 into segments of alternating character is based on non-zero indicators of a corresponding indicator array 70.

For example, as described above, the example initial input time series x comprising the sequence of data values [1, 2, 3, 2, 1, 1] has a corresponding indicator array 70 comprising the sequence of indicators [0, 0, 1, 0, −1, 0]. Therefore, partitioning of the example initial input time series x into segments of alternating character is based on non-zero indicators p[2] and p[4] of the corresponding indicator array 70.

Specifically, a segmented model 200 for the example initial input time series x comprises three segments: a first segment comprising data values x[0], x[1] and x[2], a second segment comprising data values x[3] and x[4], and a third segment comprising data value x[5]. FIG. 5B illustrates a segment table 75 maintaining segment information for each segment of the example initial input time series x.

As shown in FIG. 5B, segment information for a segment may include a total representing a combined sum of data values included in the segment, a length of the segment, and a character of the segment. For example, the first segment has a total equal to 6 (i.e., the sum of x[0], x[1] and x[2]), a length equal to 3 (i.e., the first segment includes only 3 data values), and a peak/rise character (because p[2] indicates that x[2] is a peak data value). The second segment has a total equal to 3 (i.e., the sum of x[3] and x[4]), a length equal to 2 (i.e., the second segment includes only 2 data values), and a trough/fall character (because p[4] indicates that x[4] is a trough data value). The third segment has a total equal to 1 (i.e., x[5]), a length equal to 1 (i.e., the third segment includes only 1 data value), and neither a peak/rise character nor a trough/fall character (because p[5] indicates that x[5] is neither a peak data value nor a trough data value).

The totals for the first segment, the second segment, and the third segment (i.e., 6, 3, and 1) provide a succinct approximate representation of the example initial input time series x.

Figure 6A:
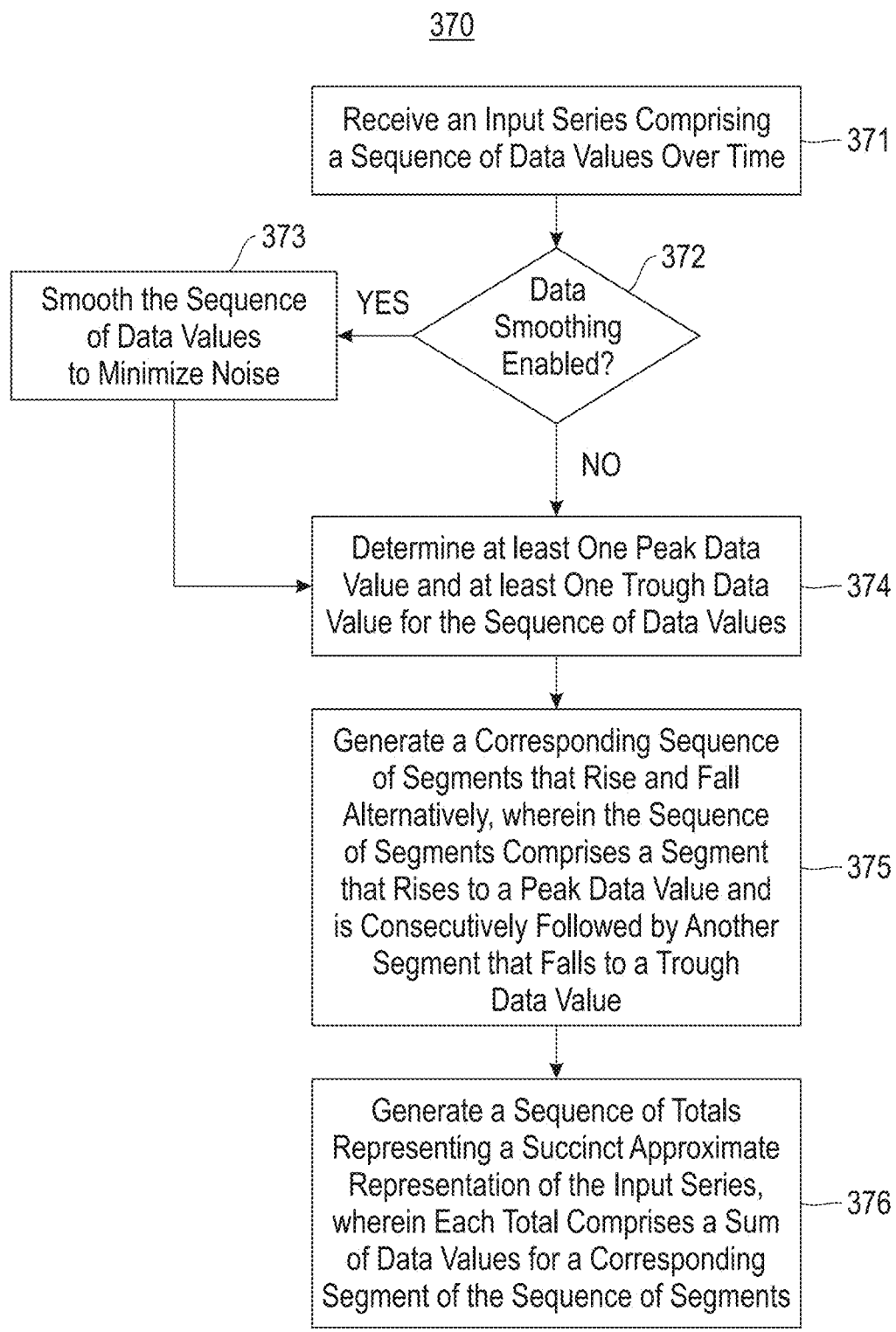
FIG. 6A illustrates a flowchart of an example process for generating a succinct approximate representation of an input series.

FIG. 6A illustrates a flowchart of an example process 370 for generating a succinct approximate representation of an input series, according to an embodiment of the present invention. In process block 371, receive an input series comprising a sequence of data values over time. In process block 372, determine whether data smoothing is enabled. If data smoothing is not enabled, proceed to process block 374. If data smoothing is enabled, proceed to process block 373 where the sequence of data values is smoothed to minimize noise. After the sequence of data values is smoothed, proceed to process block 374.

In process block 374, determine at least one peak data value and at least one trough data value for the sequence of data values. An embodiment of the function performed by process block 374 is described further above in relation to FIG. 3 and in particular in relation to peaks and troughs analysis module 134. In process block 375, generate a corresponding sequence of segments that rise and fall alternately, wherein the sequence of segments comprises a segment that rises to a peak data value and is consecutively followed by another segment that falls to a trough data value. In process block 376, generate a sequence of totals representing a succinct approximate representation of the input series, wherein each total comprises a sum of data values for a corresponding segment of the sequence of segments. An embodiment of the functions performed by process blocks 375 and 376 is described further above in relation to FIG. 3 and in particular in relation to partitioning module 139.

Figure 6B:
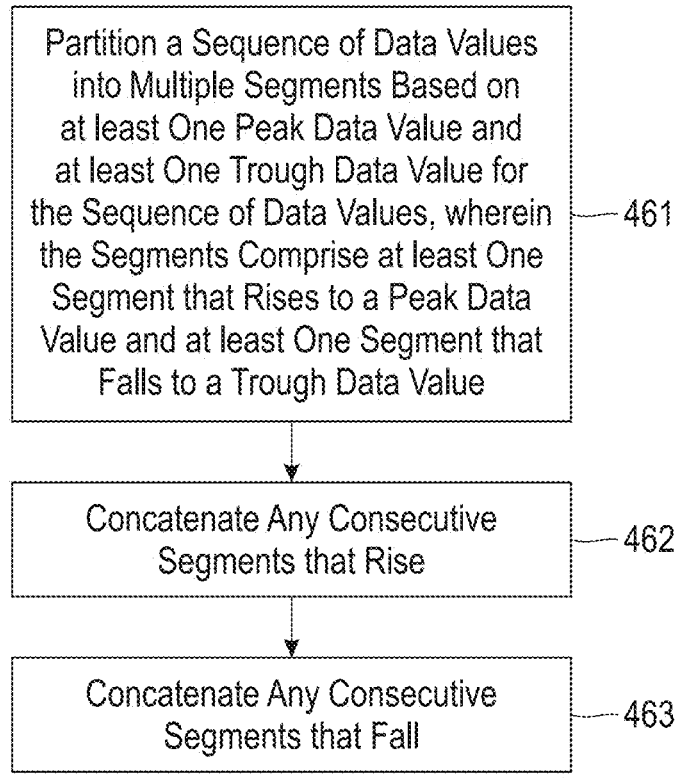
FIG. 6B illustrates a flowchart of an example process for generating a sequence of segments that rise and fall alternately for a sequence of data values, according to an embodiment of the present invention.

FIG. 6B illustrates a flowchart of an example process 460 for generating a sequence of segments that rise and fall alternately for a sequence of data values, according to an embodiment of the present invention. In process block 461, partition a sequence of data values into multiple segments based on at least one peak data value and at least one trough data value for the sequence of data values, wherein the segments comprise at least one segment that rises to a peak data value and at least one segment that falls to a trough data value. In process block 462, concatenate any consecutive segments that rise. In process block 463, concatenate any consecutive segments that fall. An embodiment of the functions performed by process blocks 461, 462 and 463 is described further above in relation to FIG. 3 and in particular in relation to segmentation module 133.

FIG. 6C illustrates a flowchart of an example process 476 for generating a sequence of segments that rise and fall alternately for a sequence of cost values for a service delivery project, according to an embodiment of the present invention. In process block 477, partition a sequence of cost values over time for a service delivery project into multiple segments, wherein each segment comprises a contiguous subsequence of the sequence of cost values, and wherein the segments comprise at least one of a segment that rises to a peak cost value of the sequence of cost values and a segment that falls to a trough cost value of the sequence of cost values. In process block 478, generate a sequence of segments that rise and fall alternately based on the segments, wherein the sequence of segments comprises a segment that rises to a peak cost value and is consecutively followed by another segment that falls to a trough cost value. In process block 479, based on the sequence of segments, generate a corresponding sequence of total cost values representing a succinct approximate representation of the sequence of cost values, wherein each total cost value comprises a sum of cost values for a corresponding segment of the sequence of segments. An embodiment of the functions performed by process blocks 477, 478 and 479 is described further above in relation to FIG. 3 and in particular in relation to similarity module 141.

Figure 6D:
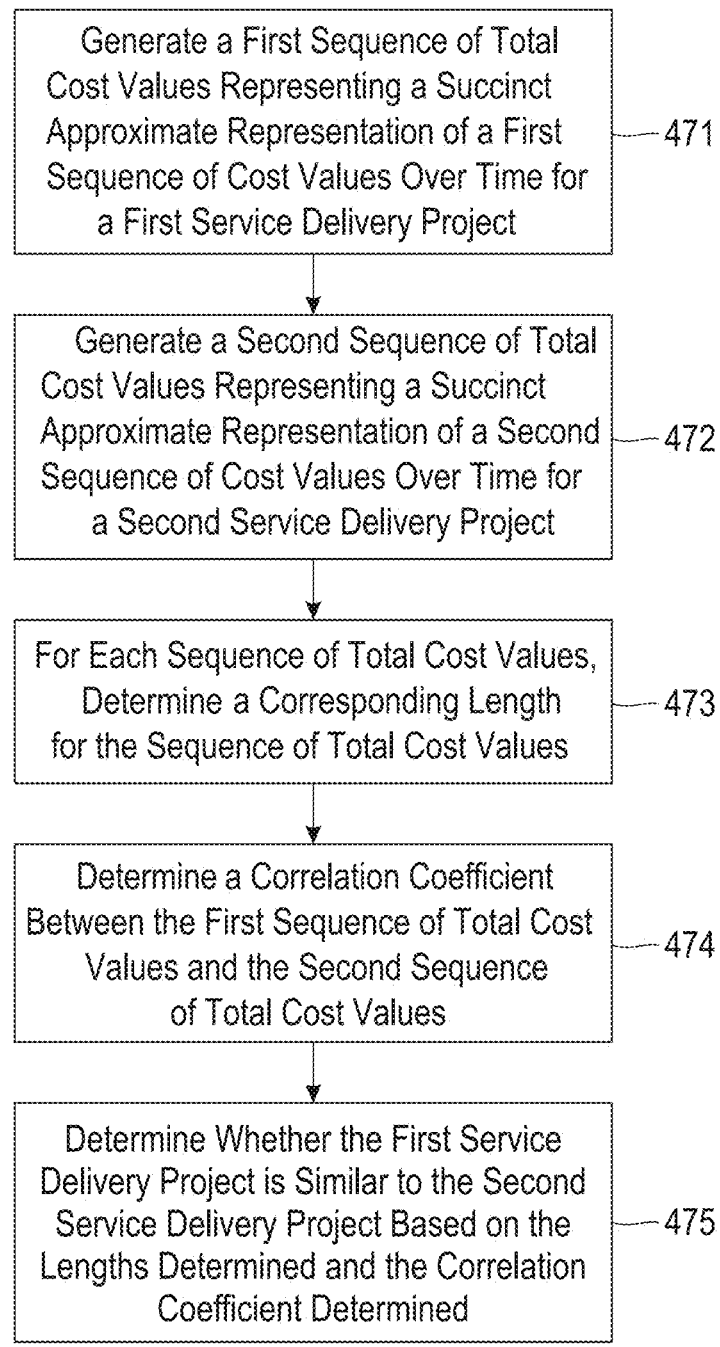
FIG. 6D illustrates a flowchart of an example process for determining whether a first service delivery project is similar to a second service delivery project, according to an embodiment of the present invention.

FIG. 6D illustrates a flowchart of an example process 470 for determining whether a first service delivery project is similar to a second service delivery project, according to an embodiment of the present invention. In process block 471, generate a first sequence of total costs values representing a succinct approximate representation of a first sequence of cost values over time for a first service delivery project. In process block 472, generate a second sequence of total costs values representing a succinct approximate representation of a second sequence of cost values over time for a second service delivery project. In process block 473, determine a corresponding length for each sequence of total cost values. In process block 474, determine a correlation coefficient between the first sequence of total cost values and the second sequence of total cost values. In process block 475, determine whether the first service delivery project is similar to the second service delivery project based on the lengths determined and the correlation coefficient determined. An embodiment of the functions performed by process blocks 471, 472, 473, 474 and 475 is described further above in relation to FIG. 3 and in particular in relation to similarity module 141.

Figure 7:
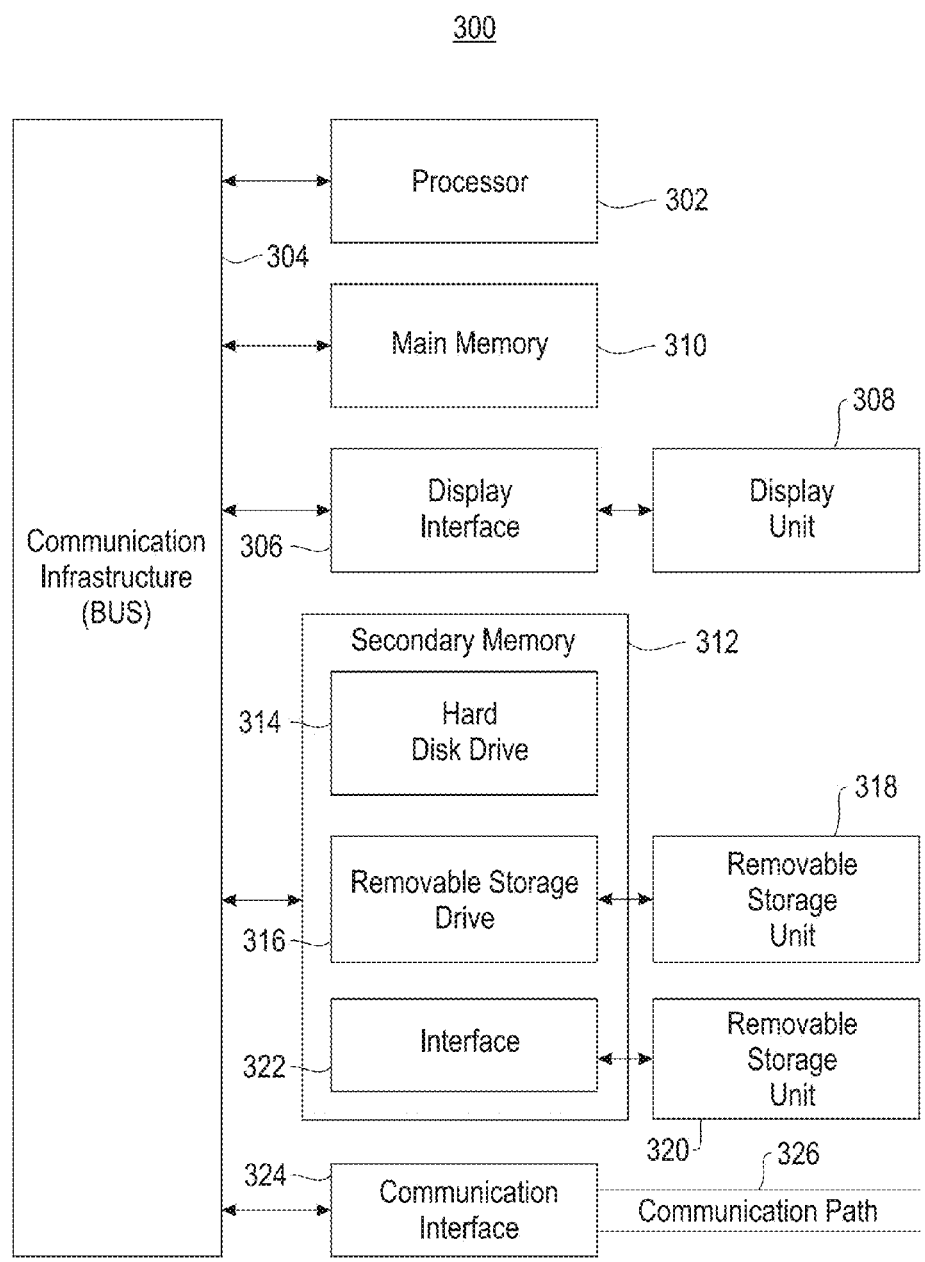
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium. The non-transitory computer-useable storage medium has a computer-readable program, wherein the program upon being processed on a computer causes the computer to implement the steps of the present invention according to the embodiments described herein. Reference in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    at a ledger storage unit:
        recording historical ledger data, wherein the historical ledger data comprises a first sequence of actual costs incurred by a first project over time and a second sequence of actual costs incurred by a second project over time;
    at a pre-processing device including at least one hardware processor:
        retrieving the first sequence of actual costs and the second sequence of actual costs from the ledger storage unit;
        performing an operation on each sequence of actual costs retrieved to minimize noise;
        constructing a first segmented model corresponding to the first sequence of actual costs and a second segmented model corresponding to the second sequence of actual costs based on the first sequence of actual costs and the second sequence of actual costs, respectively, wherein each segmented model is maintained on a models storage unit, each segmented model has a corresponding model parameter, each segmented model comprises a plurality of segments that rise and fall alternately, each segment of each plurality of segments comprises a contiguous subsequence of a corresponding sequence of actual costs, and each plurality of segments comprises at least one segment that rises to at least one peak actual cost of a corresponding sequence of actual costs and at least one other segment that falls to at least one trough actual cost of the corresponding sequence of actual costs;
        generating a first sequence of total costs corresponding to the first segmented model and a second sequence of total costs corresponding to the second segmented model based on the first segmented model and the second segmented model, respectively, wherein each total cost of each sequence of total costs corresponds to a segment of a corresponding segmented model, each total cost comprises a sum of actual costs included in a corresponding segment, and each total cost has a corresponding length representing a number of actual costs included in a corresponding segment;

computing a first length corresponding to the first sequence of total costs and a second length corresponding to the second sequence of total costs based on the first sequence of total costs and the second sequence of total costs, respectively, wherein each length corresponding to each sequence of total costs represents a number of total costs included in the corresponding sequence of total costs; and computing a correlation coefficient between the first sequence of total costs and the second sequence of total costs;

at a training device including at least one hardware processor:

for each segmented model maintained on the models storage unit, training the segmented model to better fit the historical ledger data by adjusting a corresponding model parameter to minimize a discrepancy between an aggregate of all segmented models maintained on the models storage unit and an aggregate of the historical ledger data; and training the training device to forecast long-range cost estimations corresponding to a project based on at least on segmented model maintained on the models storage unit, wherein each long-range cost estimations is maintained on a predictions storage unit, and each long-range cost estimations represents cost estimations for a corresponding project up to an end date scheduled in the future; and at a reporting device including at least one hardware processor:

displaying an interactive user interface on a display device;

providing, via the interactive user interface, a report indicative of whether the first project is similar to the second project, wherein the report is based on the first length and the second length computed, the correlation coefficient computed, and read-only, pre-indexed data maintained on a reporting storage unit and extracted from the first segmented model and the second segmented model maintained on the models storage unit; and reporting forecasting results corresponding to a project via the interactive user interface, wherein the forecasting results is based on the read-only, pre-indexed data maintained on the reporting storage unit and corresponding long-range cost estimations maintained on the predictions storage unit;

wherein the historical ledger data is updated on a periodic basis.

2. The method of claim 1, wherein:

constructing a first segmented model corresponding to the first sequence of actual costs and a second segmented model corresponding to the second sequence of actual costs based on the first sequence of actual costs and the second sequence of actual costs, respectively:

partitioning the first sequence of actual costs into a first plurality of segments, each segment of the first plurality of segments comprising a contiguous subsequence of the first sequence of actual costs, the first plurality of segments comprising at least one rising segment that rises to at least one peak data value of the first sequence of actual costs, and the first plurality of segments further comprising at least one falling segment that falls to at least one trough data value of the first sequence of actual costs;

generating a first sequence of segments that rise and fall alternately by concatenating consecutive rising segments of the first plurality of segments and concatenating consecutive falling segments of the first plurality of segments, the first sequence of segments representing the first segmented model;

partitioning the second sequence of actual costs into a second plurality of segments, each segment of the second plurality of segments comprising a contiguous subsequence of the second sequence of actual costs, the second plurality of segments comprising at least one rising segment that rises to at least one peak data value of the second sequence of actual costs, and the second plurality of segments further comprising at least one falling segment that falls to at least one trough data value of the second sequence of actual costs; and generating a second sequence of segments that rise and fall alternately by concatenating consecutive rising segments of the second plurality of segments and concatenating consecutive falling segments of the second plurality of segments, the second sequence of segments representing the second segmented model;

each peak actual cost of each sequence of actual costs is no less than a first and a second subset of actual costs immediately preceding and immediately following the peak actual cost in the sequence of actual costs, respectively, and at least one of the first and the second subset of actual costs comprises a contiguous subsequence of at least two actual costs of the sequence of actual costs;

each trough actual cost of each sequence of actual costs is no greater than a third and a fourth subset of actual costs immediately preceding and immediately following the trough actual cost in the sequence of actual costs, respectively, and at least one of the third and the fourth subset of actual costs comprises a contiguous subsequence of at least two actual costs of the sequence of actual costs;

each peak actual cost of each sequence of actual costs is greater than an actual cost immediately preceding the peak actual cost in the sequence of actual costs; and each trough actual cost of each sequence of actual costs is less than an actual cost immediately preceding the trough actual cost in the sequence of actual costs.

3. The method of claim 1, further comprising:

in response to a request received via the interactive user interface to aggregate the report, customizing the report by aggregating the report based on a dimension specified via the interactive user interface, wherein the dimension is one of sector, business domain, or customer; and at the training device:

forecasting first long-range cost estimations corresponding to the first project based on the first segmented model, wherein the first long-range cost estimations are maintained on the predictions storage unit, the first long-range cost estimations represent cost estimations for the first project up to a first end date scheduled in the future, and the first long-range cost estimations are aligned and re-shaped based on the historical ledger data utilizing the pre-processing device; and forecasting second long-range cost estimations corresponding to the second project based on the second segmented model, wherein the second long-range cost estimations are maintained on the predictions storage unit, the second long-range cost estimations represent cost estimations for the second project up to a second end date scheduled in the future, and the second long-range cost estimations are aligned and re-shaped based on the historical ledger data utilizing the pre-processing device.

4. A method, comprising:

at a ledger storage unit:
  recording historical ledger data, wherein the historical ledger data comprises a first sequence of actual costs incurred by a first service delivery project over time and a second sequence of actual costs incurred by a second service delivery project over time;

at a pre-processing device including at least one hardware processor:
  retrieving the first sequence of actual costs and the second sequence of actual costs from the ledger storage unit;
  performing an operation on each sequence of actual costs retrieved to minimize noise;
  constructing a first segmented model corresponding to the first sequence of actual costs and a second segmented model corresponding to the second sequence of actual costs based on the first sequence of actual costs and the second sequence of actual costs, respectively, wherein each segmented model is maintained on a models storage unit, each segmented model has a corresponding model parameter, each segmented model comprises a plurality of segments that rise and fall alternately, each segment of each plurality of segments comprises a contiguous subsequence of a corresponding sequence of actual costs, and each plurality of segments comprises at least one segment that rises to at least one peak actual cost of a corresponding sequence of actual costs and at least one other segment that falls to at least one trough actual cost of the corresponding sequence of actual costs;
  generating a first sequence of total costs corresponding to the first segmented model and a second sequence of total costs corresponding to the second segmented model based on the first segmented model and the second segmented model, respectively, wherein each total cost of each sequence of total costs corresponds to a segment of a corresponding segmented model, each total cost comprises a sum of actual costs included in a corresponding segment, and each total cost has a corresponding length representing a number of actual costs included in a corresponding segment;
  computing a first length corresponding to the first sequence of total costs and a second length corresponding to the second sequence of total costs based on the first sequence of total costs and the second sequence of total costs, respectively, wherein each length corresponding to each sequence of total costs represents a number of total costs included in the corresponding sequence of total costs; and
  computing a correlation coefficient between the first sequence of total costs and the second sequence of total costs;

at a training device including at least one hardware processor:
  for each segmented model maintained on the models storage unit, training the segmented model to better fit the historical ledger data by adjusting a corresponding model parameter to minimize a discrepancy between an aggregate of all segmented models maintained on the models storage unit and an aggregate of the historical ledger data; and
  training the training device to forecast long-range cost estimations corresponding to a service delivery project based on at least on segmented model maintained on the models storage unit, wherein each long-range cost estimations is maintained on a predictions storage unit, and each long-range cost estimations represents cost estimations for a corresponding service delivery project up to an end date scheduled in the future; and at a reporting device including at least one hardware processor:
  displaying an interactive user interface on a display device;
  providing, via the interactive user interface, a report indicative of whether the first service delivery project is similar to the second service delivery project, wherein the report is based on the first length and the second length computed, the correlation coefficient computed, and read-only, pre-indexed data maintained on a reporting storage unit and extracted from the first segmented model and the second segmented model maintained on the models storage unit; and
  reporting forecasting results corresponding to a service delivery project via the interactive user interface, wherein the forecasting results is based on the read-only, pre-indexed data maintained on the reporting storage unit and corresponding long-range cost estimations maintained on the predictions storage unit;

wherein the historical ledger data is updated on a periodic basis.

5. The method of claim 4, wherein constructing a first segmented model corresponding to the first sequence of actual costs and a second segmented model corresponding to the second sequence of actual costs based on the first sequence of actual costs and the second sequence of actual costs, respectively, comprises:

partitioning the first sequence of actual costs into a first plurality of segments, each segment of the first plurality of segments comprising a contiguous subsequence of the first sequence of actual costs, the first plurality of segments comprising at least one rising segment that rises to at least one peak data value of the first sequence of actual costs, and the first plurality of segments further comprising at least one falling segment that falls to at least one trough data value of the first sequence of actual costs;

generating a first sequence of segments that rise and fall alternately by concatenating consecutive rising segments of the first plurality of segments and concatenating consecutive falling segments of the first plurality of segments, the first sequence of segments representing the first segmented model;

partitioning the second sequence of actual costs into a second plurality of segments, each segment of the second plurality of segments comprising a contiguous subsequence of the second sequence of actual costs, the second plurality of segments comprising at least one rising segment that rises to at least one peak data value of the second sequence of actual costs, and the second plurality of segments further comprising at least one falling segment that falls to at least one trough data value of the second sequence of actual costs; and generating a second sequence of segments that rise and fall alternately by concatenating consecutive rising segments of the second plurality of segments and concatenating consecutive falling segments of the second plurality of segments, the second sequence of segments representing the second segmented model.

6. The method of claim 4, wherein:
each peak actual cost of each sequence of actual costs is no less than at least three other actual costs of the sequence of cost values; and
each trough actual cost of each sequence of actual costs is no greater than at least three other actual costs of the sequence of cost values.

7. The method of claim 6, wherein:
each peak actual cost of each sequence of actual costs is greater than an actual cost immediately preceding the peak actual cost in the sequence of actual costs; and
each trough actual cost of each sequence of actual costs is less than an actual cost immediately preceding the trough actual cost in the sequence of actual costs.

8. The method of claim 7, wherein:
each peak actual cost of each sequence of actual costs is no less than a first and a second subset of actual costs immediately preceding and immediately following the peak actual cost in the sequence of actual costs, respectively, and at least one of the first and the second subset of actual costs comprises a contiguous subsequence of at least two actual costs of the sequence of actual costs; and
each trough actual cost of each sequence of actual costs is no greater than a third and a fourth subset of actual costs immediately preceding and immediately following the trough actual cost in the sequence of actual costs, respectively, and at least one of the third and the fourth subset of actual costs comprises a contiguous subsequence of at least two actual costs of the sequence of actual costs.

9. The method of claim 4, further comprising:
at the training device:
forecasting first long-range cost estimations corresponding to the first service delivery project based on the first segmented model, wherein the first long-range cost estimations are maintained on the predictions storage unit, the first long-range cost estimations represent cost estimations for the first service delivery project up to a first end date scheduled in the future, and the first long-range cost estimations are aligned and re-shaped based on the historical ledger data; and
forecasting second long-range cost estimations corresponding to the second service delivery project based on the second segmented model, wherein the second long-range cost estimations are maintained on the predictions storage unit, the second long-range cost estimations represent cost estimations for the second service delivery project up to a second end date scheduled in the future, and the second long-range cost estimations are aligned and re-shaped based on the historical ledger data.

10. The method of claim 9, wherein the first service delivery project is similar to the second service delivery project upon satisfying each of the following conditions: the first length and the second length are equal, and the correlation coefficient exceeds a pre-determined threshold.

11. The method of claim 4, further comprising:
at the reporting device:
in response to a request received via the interactive user interface to aggregate the report, customizing the report by aggregating the report based on a dimension specified via the interactive user interface.

12. The method of claim 11, wherein the dimension is one of sector, business domain, or customer.

13. A system, comprising:
at least one processor; and
a non-transitory processor-readable memory device storing instructions that when executed by the at least one processor causes the at least one processor to perform operations including:
at a ledger storage unit:
recording historical ledger data, wherein the historical ledger data comprises a first sequence of actual costs incurred by a first service delivery project over time and a second sequence of actual costs incurred by a second service delivery project over time;
at a pre-processing device including at least one hardware processor:
retrieving the first sequence of actual costs and the second sequence of actual costs from the ledger storage unit;
performing an operation on each sequence of actual costs retrieved to minimize noise;
constructing a first segmented model corresponding to the first sequence of actual costs and a second segmented model corresponding to the second sequence of actual costs based on the first sequence of actual costs and the second sequence of actual costs, respectively, wherein each segmented model is maintained on a models storage unit, each segmented model has a corresponding model parameter, each segmented model comprises a plurality of segments that rise and fall alternately, each segment of each plurality of segments comprises a contiguous subsequence of a corresponding sequence of actual costs, and each plurality of segments comprises at least one segment that rises to at least one peak actual cost of a corresponding sequence of actual costs and at least one other segment that falls to at least one trough actual cost of the corresponding sequence of actual costs;
generating a first sequence of total costs corresponding to the first segmented model and a second sequence of total costs corresponding to the second segmented model based on the first segmented model and the second segmented model, respectively, wherein each total cost of each sequence of total costs corresponds to a segment of a corresponding segmented model, each total cost comprises a sum of actual costs included in a corresponding segment, and each total cost has a corresponding length representing a number of actual costs included in a corresponding segment;
computing a first length corresponding to the first sequence of total costs and a second length corresponding to the second sequence of total costs based on the first sequence of total costs and the second sequence of total costs, respectively, wherein each length corresponding to each sequence of total costs represents a number of total costs included in the corresponding sequence of total costs; and computing a correlation coefficient between the first sequence of total costs and the second sequence of total costs;

at a training device including at least one hardware processor:

for each segmented model maintained on the models storage unit, training the segmented model to better fit the historical ledger data by adjusting a corresponding model parameter to minimize a discrepancy between an aggregate of all segmented models maintained on the models storage unit and an aggregate of the historical ledger data; and training the training device to forecast long-range cost estimations corresponding to a service delivery project based on at least on segmented model maintained on the models storage unit, wherein each long-range cost estimations is maintained on a predictions storage unit, and each long-range cost estimations represents cost estimations for a corresponding service delivery project up to an end date scheduled in the future; and at a reporting device including at least one hardware processor:

displaying an interactive user interface on a display device; providing, via the interactive user interface, a report indicative of whether the first service delivery project is similar to the second service delivery project, wherein the report is based on the first length and the second length computed, the correlation coefficient computed, and read-only, pre-indexed data maintained on a reporting storage unit and extracted from the first segmented model and the second segmented model maintained on the models storage unit; and reporting forecasting results corresponding to a service delivery project via the interactive user interface, wherein the forecasting results is based on the read-only, pre-indexed data maintained on the reporting storage unit and corresponding long-range cost estimations maintained on the predictions storage unit;

wherein the historical ledger data is updated on a periodic basis.

14. The system of claim 13, wherein constructing a first segmented model corresponding to the first sequence of actual costs and a second segmented model corresponding to the second sequence of actual costs based on the first sequence of actual costs and the second sequence of actual costs, respectively, comprises:

partitioning the first sequence of actual costs into a first plurality of segments, each segment of the first plurality of segments comprising a contiguous subsequence of the first sequence of actual costs, the first plurality of segments comprising at least one rising segment that rises to at least one peak data value of the first sequence of actual costs, and the first plurality of segments further comprising at least one falling segment that falls to at least one trough data value of the first sequence of actual costs;

generating a first sequence of segments that rise and fall alternately by concatenating consecutive rising segments of the first plurality of segments and concatenating consecutive falling segments of the first plurality of segments, the first sequence of segments representing the first segmented model;

partitioning the second sequence of actual costs into a second plurality of segments, each segment of the second plurality of segments comprising a contiguous subsequence of the second sequence of actual costs, the second plurality of segments comprising at least one rising segment that rises to at least one peak data value of the second sequence of actual costs, and the second plurality of segments further comprising at least one falling segment that falls to at least one trough data value of the second sequence of actual costs; and generating a second sequence of segments that rise and fall alternately by concatenating consecutive rising segments of the second plurality of segments and concatenating consecutive falling segments of the second plurality of segments, the second sequence of segments representing the second segmented model.

15. The system of claim 13, wherein:

each peak actual cost of each sequence of actual costs is no less than at least three other actual costs of the sequence of cost values;

each trough actual cost of each sequence of actual costs is no greater than at least three other actual costs of the sequence of cost values;

each peak actual cost of each sequence of actual costs is no less than a first and a second subset of actual costs immediately preceding and immediately following the peak actual cost in the sequence of actual costs, respectively, and at least one of the first and the second subset of actual costs comprises a contiguous subsequence of at least two actual costs of the sequence of actual costs; and each trough actual cost of each sequence of actual costs is no greater than a third and a fourth subset of actual costs immediately preceding and immediately following the trough actual cost in the sequence of actual costs, respectively, and at least one of the third and the fourth subset of actual costs comprises a contiguous subsequence of at least two actual costs of the sequence of actual costs.

16. The system of claim 13, wherein the operations further include:

at the training device:

forecasting first long-range cost estimations corresponding to the first service delivery project based on the first segmented model, wherein the first long-range cost estimations are maintained on the predictions storage unit, the first long-range cost estimations represent cost estimations for the first service delivery project up to a first end date scheduled in the future, and the first long-range cost estimations are aligned and re-shaped based on the historical ledger data; and forecasting second long-range cost estimations corresponding to the second service delivery project based on the second segmented model, wherein the second long-range cost estimations are maintained on the predictions storage unit, the second long-range cost estimations represent cost estimations for the second service delivery project up to a second end date scheduled in the future, and the second long-range cost estimations are aligned and re-shaped based on the historical ledger data.

17. The system of claim 16, wherein the first service delivery project is similar to the second service delivery project upon satisfying each of the following conditions: the first length and the second length are equal, and the correlation coefficient exceeds a pre-determined threshold.

18. The system of claim 13, wherein the operations further include:
at the reporting device:
in response to a request received via the interactive user interface to aggregate the report, customizing the report by aggregating the report based on a dimension specified via the interactive user interface, wherein the dimension is one of sector, business domain, or customer.

19. A non-transitory computer program product for analyzing and comparing service delivery projects, the computer program product comprising a tangible storage medium readable by a computer system and storing instructions for execution by the computer system for performing a method comprising:
at a ledger storage unit:
recording historical ledger data, wherein the historical ledger data comprises a first sequence of actual costs incurred by a first service delivery project over time and a second sequence of actual costs incurred by a second service delivery project over time;
at a pre-processing device including at least one hardware processor:
retrieving the first sequence of actual costs and the second sequence of actual costs from the ledger storage unit;
performing an operation on each sequence of actual costs retrieved to minimize noise;
constructing a first segmented model corresponding to the first sequence of actual costs and a second segmented model corresponding to the second sequence of actual costs based on the first sequence of actual costs and the second sequence of actual costs, respectively, wherein each segmented model is maintained on a models storage unit, each segmented model has a corresponding model parameter, each segmented model comprises a plurality of segments that rise and fall alternately, each segment of each plurality of segments comprises a contiguous subsequence of a corresponding sequence of actual costs, and each plurality of segments comprises at least one segment that rises to at least one peak actual cost of a corresponding sequence of actual costs and at least one other segment that falls to at least one trough actual cost of the corresponding sequence of actual costs;
generating a first sequence of total costs corresponding to the first segmented model and a second sequence of total costs corresponding to the second segmented model based on the first segmented model and the second segmented model, respectively, wherein each total cost of each sequence of total costs corresponds to a segment of a corresponding segmented model, each total cost comprises a sum of actual costs included in a corresponding segment, and each total cost has a corresponding length representing a number of actual costs included in a corresponding segment;
computing a first length corresponding to the first sequence of total costs and a second length corresponding to the second sequence of total costs based on the first sequence of total costs and the second sequence of total costs, respectively, wherein each length corresponding to each sequence of total costs represents a number of total costs included in the corresponding sequence of total costs; and
computing a correlation coefficient between the first sequence of total costs and the second sequence of total costs;
at a training device including at least one hardware processor:
for each segmented model maintained on the models storage unit, training the segmented model to better fit the historical ledger data by adjusting a corresponding model parameter to minimize a discrepancy between an aggregate of all segmented models maintained on the models storage unit and an aggregate of the historical ledger data; and
training the training device to forecast long-range cost estimations corresponding to a service delivery project based on at least on segmented model maintained on the models storage unit, wherein each long-range cost estimations is maintained on a predictions storage unit, and each long-range cost estimations represents cost estimations for a corresponding service delivery project up to an end date scheduled in the future; and
at a reporting device including at least one hardware processor:
displaying an interactive user interface on a display device;
providing, via the interactive user interface, a report indicative of whether the first service delivery project is similar to the second service delivery project, wherein the report is based on the first length and the second length computed, the correlation coefficient computed, and read-only, pre-indexed data maintained on a reporting storage unit and extracted from the first segmented model and the second segmented model maintained on the models storage unit; and
reporting forecasting results corresponding to a service delivery project via the interactive user interface, wherein the forecasting results is based on the read-only, pre-indexed data maintained on the reporting storage unit and corresponding long-range cost estimations maintained on the predictions storage unit;
wherein the historical ledger data is updated on a periodic basis.

20. The computer program product of claim 19, wherein constructing a first segmented model corresponding to the first sequence of actual costs and a second segmented model corresponding to the second sequence of actual costs based on the first sequence of actual costs and the second sequence of actual costs, respectively, comprises:
partitioning the first sequence of actual costs into a first plurality of segments, each segment of the first plurality of segments comprising a contiguous subsequence of the first sequence of actual costs, the first plurality of segments comprising at least one rising segment that rises to at least one peak data value of the first sequence of actual costs, and the first plurality of segments further comprising at least one falling segment that falls to at least one trough data value of the first sequence of actual costs;
generating a first sequence of segments that rise and fall alternately by concatenating consecutive rising segments of the first plurality of segments and concatenating consecutive falling segments of the first plurality of segments, the first sequence of segments representing the first segmented model;
partitioning the second sequence of actual costs into a second plurality of segments, each segment of the second plurality of segments comprising a contiguous subsequence of the second sequence of actual costs, the second plurality of segments comprising at least one rising segment that rises to at least one peak data value of the second sequence of actual costs, and the second plurality of segments further comprising at least one falling segment that falls to at least one trough data value of the second sequence of actual costs; and generating a second sequence of segments that rise and fall alternately by concatenating consecutive rising segments of the second plurality of segments and concatenating consecutive falling segments of the second plurality of segments, the second sequence of segments representing the second segmented model.

* * * * *